United States Patent
Rhodes

(10) Patent No.: US 7,291,261 B1
(45) Date of Patent: Nov. 6, 2007

(54) POOL CHEMICAL DISPENSER

(76) Inventor: Chris Rhodes, 2276 Holden Beach Rd. SW., Supply, NC (US) 28462

( * ) Notice: Subject to any disclaimer, the term of this patent is extended or adjusted under 35 U.S.C. 154(b) by 0 days.

(21) Appl. No.: 11/602,773

(22) Filed: Nov. 21, 2006

(51) Int. Cl.
*E04H 4/12* (2006.01)
*B01D 11/02* (2006.01)
*C02F 1/76* (2006.01)

(52) U.S. Cl. .............................. 210/167.11; 210/198.1; 210/416.2; 422/261

(58) Field of Classification Search ............. 210/167.1, 210/167.11, 198.1, 416.1, 416.2; 422/261
See application file for complete search history.

(56) References Cited

U.S. PATENT DOCUMENTS

| | | | | |
|---|---|---|---|---|
| 2,405,167 | A | * | 8/1946 | Royer et al. .................. 68/3 R |
| 3,456,801 | A | * | 7/1969 | Bowles ........................ 210/123 |
| 3,625,398 | A | * | 12/1971 | Tometsko .................... 222/52 |
| 3,767,557 | A | * | 10/1973 | Lamm ........................ 204/263 |
| 4,020,865 | A | * | 5/1977 | Moffat et al. ................ 137/268 |
| 4,026,673 | A | * | 5/1977 | Russo ......................... 422/278 |
| 4,224,154 | A | | 9/1980 | Steininger |
| 4,381,240 | A | | 4/1983 | Russell |
| 4,718,447 | A | * | 1/1988 | Marshall ....................... 137/268 |
| 4,790,981 | A | * | 12/1988 | Mayer et al. ................ 422/263 |
| 4,808,290 | A | * | 2/1989 | Hilbig ...................... 204/228.2 |
| 5,019,250 | A | | 5/1991 | Lorenzen |
| 5,251,656 | A | | 10/1993 | Sexton, Sr. |
| 5,422,014 | A | | 6/1995 | Allen et al. |
| 5,849,199 | A | | 12/1998 | Jack |
| 5,895,565 | A | | 4/1999 | Steininger et al. |
| 6,003,164 | A | | 12/1999 | Leaders |
| 6,182,681 | B1 | * | 2/2001 | Robertson et al. .......... 137/268 |
| 6,238,555 | B1 | * | 5/2001 | Silveri et al. ................ 210/143 |

* cited by examiner

*Primary Examiner*—Fred G. Prince
(74) *Attorney, Agent, or Firm*—Lawrence J. Gibney, Jr.

(57) ABSTRACT

This is a device which will make the monitoring and regulation of chemicals in a pool easy and convenient. It will also make it as automatic as possible for the user to accurately monitor the chemical levels and add the appropriate chemicals. The user may preset the amount and time of the specific chemicals to be added and may adjust for factors such as usage and time of year.

6 Claims, 4 Drawing Sheets

POOL CHEMICAL DISPENSER

BACKGROUND OF THE INVENTION

A. Field of the Invention

This device relates to adding chemicals to a swimming pool by a mechanical means on an automatic schedule.

B. Prior Art

The maintenance of a pool requires among other things proper chemical levels. The pool owner is very familiar with checking chlorine and acid levels in the pool and physically adding the appropriate chemicals to maintain the proper balance to the swimming pool water. A proper balance of chemicals will provide maximum comfort for the user of the pool as well as reduced maintenance for the pool owner.

In order to maintain proper chemical levels other devices have been patented to monitor the appropriate levels and add chemicals as needed.

Representative examples include Leaders, U.S. Pat. No. 6,003,164, Steininger, U.S. Pat. No. 4,224,154 and Lorenzen, U.S. Pat. No. 5,019,250.

These devices monitor pool chemical levels in a variety of different fashions and automatically dispense chemicals into the pool. However, the instant invention achieves that result in a much simpler fashion in a way not contemplated by the prior inventions. This device monitors the pool water for proper chemical balance and is equipped to add chemicals automatically to the pool.

BRIEF SUMMARY OF THE INVENTION

This is a device is an automatic chemical dispenser for swimming pools. Although many different chemical levels should be maintained, proper chlorination of a pool is perhaps the most basic and most important.

In this device, granulated chlorine is inserted into a chamber, and liquid chlorine is in another chamber, which is encapsulated on top of a base.

The chlorine is stored in these chambers until it is time to enter the pool. The device detects the level of chlorine in the pool and when appropriate will allow an appropriate amount of liquid chlorine to be injected into the pool's water through a valve. A vibrator will help the granulated chlorine fall. Granulated chlorine will leave a holding chamber and enter a mixing chamber. The chlorine will be mixed with pool water in the mixing chamber and be allowed to reenter the pool. Appropriate parameters and presets can be entered by the pool owner so that the addition of needed chemicals is automatic. Although chlorine has been specifically mentioned, all chemical levels can be monitored and the appropriate chemicals may be added with this device.

Electrical power and associated monitoring equipment also allows the unit to monitor the pH level in the pool. This is a device that can be used for most pools. A monitor and key pad allow for most chemicals that are needed to be supplied to a pool. Additionally, the device is equipped with a timer so you can swim all day and then add your chlorine to the pool when everyone is in bed.

Additionally, the unit allows for a winter and a summer cycle. During the winter cycle less chemicals are needed due to the cold weather and lack of pool use and the fewer amount of light hours. However, during the summer, the need for chemicals will increase due to the effects of sunlight, increased temperature and increased use.

It is the object of this invention to make the monitoring and addition of chemicals into pools as automatic as possible.

DETAILED DESCRIPTION OF THE EMBODIMENTS

Figure 1:
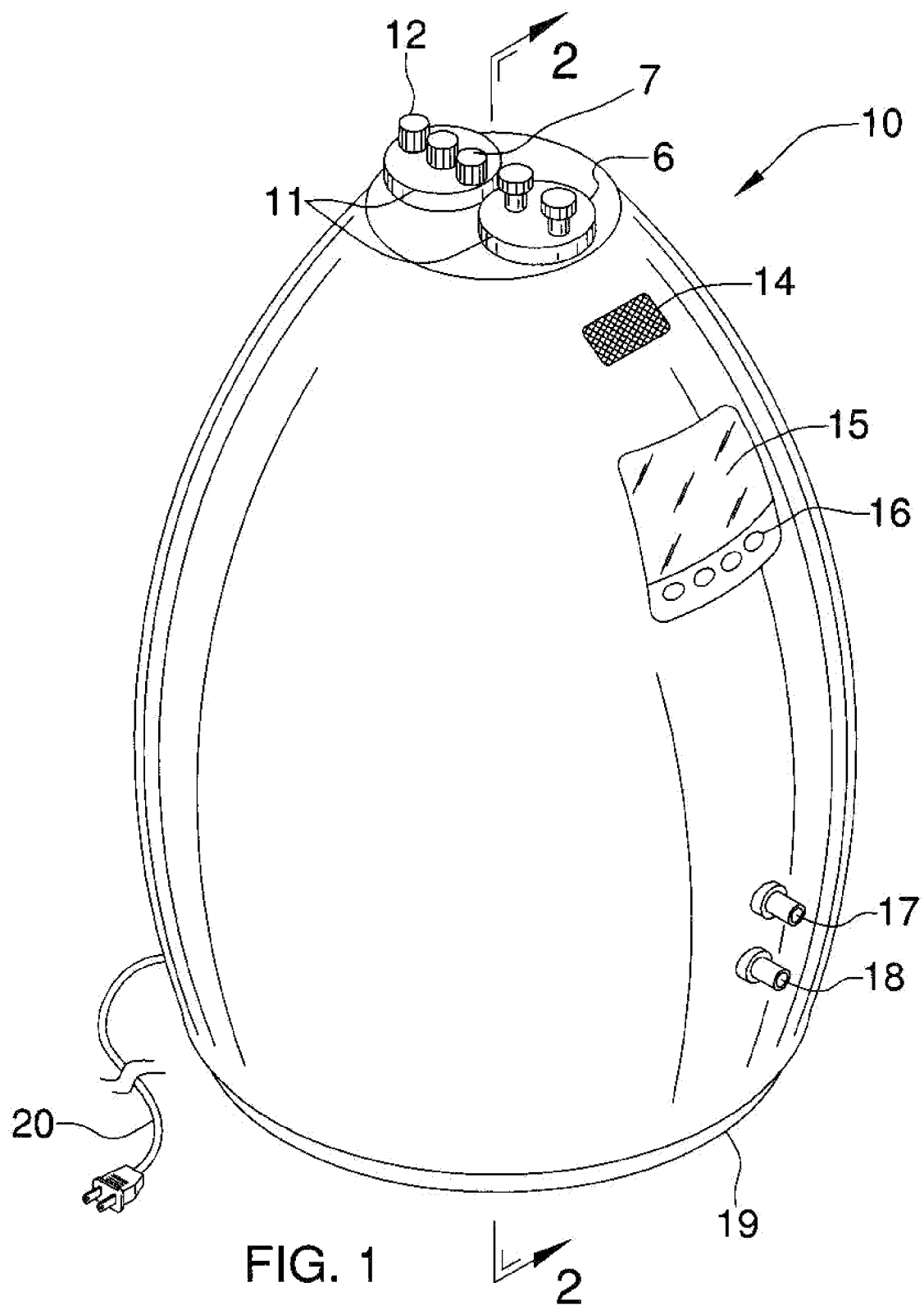
FIG. 1 is a isometric view of the device.

FIG. 1 is a perspective view of the outside of this device 10 with all external fittings, monitoring equipment and access to various points to add chemicals.

The device 10 rests on a base 19. An exterior shell covers the interior workings of this particular device. It is anticipated that the choice of materials used in the construction of the device will be plastic. The device 10 will rest on a base 19 preferably out of view from the pool user and in close proximity to the pool filtering equipment.

On the exterior surface of the shell are three lines: the intake 17, the outlet 25 and the drain line 18. This device allows the addition of chemicals after the water has passed through the filtering equipment 64. Water travels from the pool via the main drain line 61 and skimmer port lines 62 to the pool pump 63. The pump 63 forces the water through the main filtering equipment 64 of the pool.

The water then flows through this device 10 by means of the intake 17 and piping 68 from the filtering equipment and allows the monitoring of chemical levels via remote sensors 70 located at predetermined locations in the pool—as well as the addition of chemicals, if needed.

The water exits the unit through the outlet 25 and is allowed to reenter the pool through the piping 65 for that purpose. A drain line 67 is provided from the filtering equipment 64 as well as the drain outlet of the device 18 to allow the water to be drained, if needed.

The outlet 25 from the device directs the monitored water and possibly water that is mixed with chemicals into the pool. If chemicals are added after that cycle is complete the remaining water left in the mixing chamber is drained out of the system via the drain line 18 and connected to the drain line from the pool filtering equipment 67.

A monitor 15 and keypad 16 on the outside of the shell to monitor the chemical levels and let the owner decide the day and time of the week to add granulated chlorine to the pool is provided.

A moisture collector 14, which is probably a packet of desiccation material that is commonly found in the prior art, is placed in a cavity adjacent to the granulated chlorine chamber and is used to absorb moisture so that the chlorine does not harden within the chamber 13. The moisture collector cavity 14 is located slightly above the monitor 15 and keypad 16 and is accessible from the outside of the device to change the packet of drying material.

On the top of the device is a lid for the granulated chlorine 6 and a lid for liquid chlorine 7 and the other chemicals 12. Beneath the respective lids are the granulated chlorine chamber 13 and the liquid chlorine chamber 30 and other chemical chambers 28. Each of the chambers is separate from each other.

Granulated chlorine is inserted into the chlorine chamber 13 and converted into a liquid when it is mixed with the pool water as it enters the device via the intake line 17. Liquid chlorine is inserted into chlorine chamber 30 and can be injected at any time into the discharge line 25 to the pool.

The chemical chambers 28 are used to release various other chemicals into the pool. Other chemicals may include acid, buffers or chemicals to impede scaling.

Figure 2:
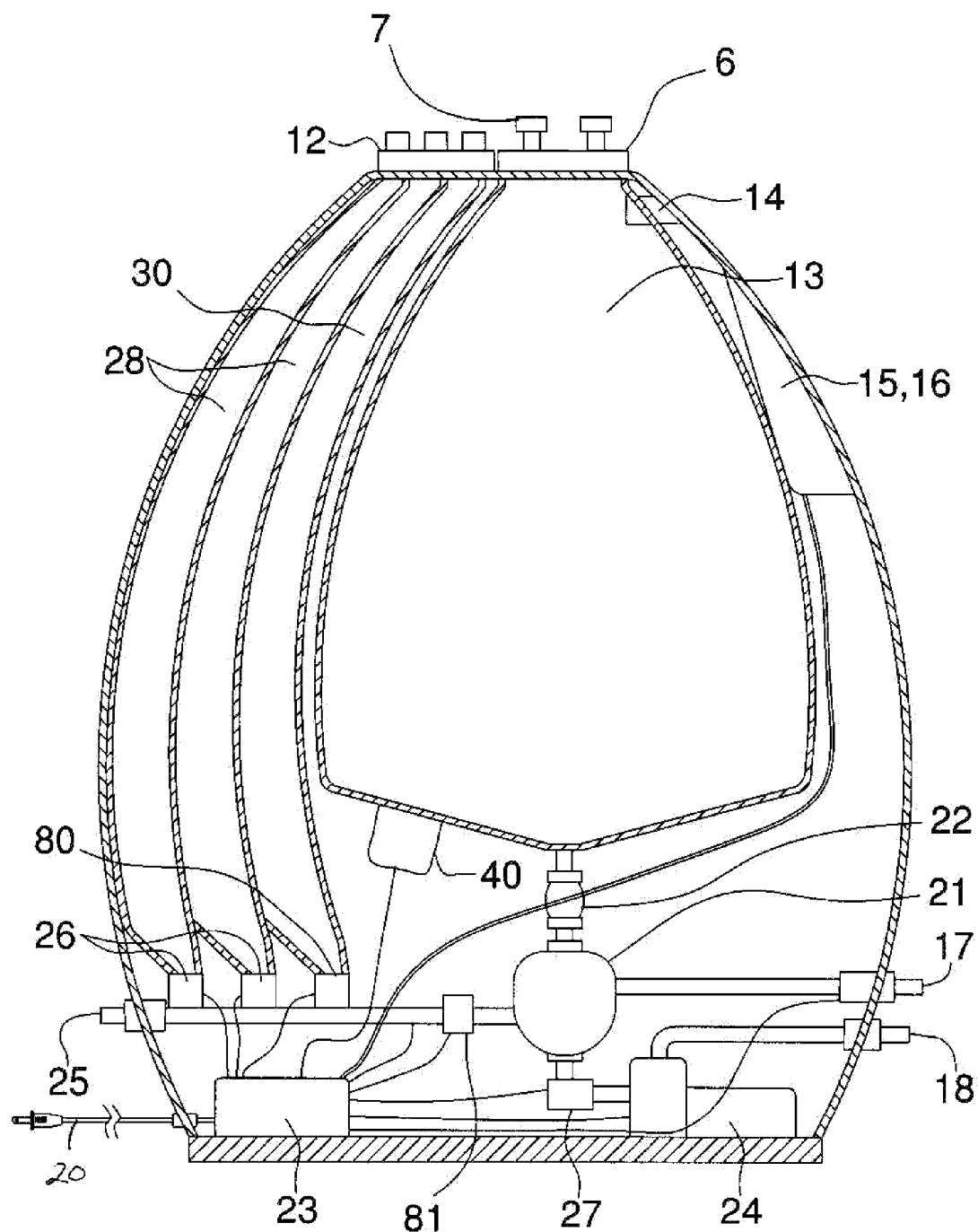
FIG. 2 is a cross sectional view of the device according to line 2-2 on FIG. 1.

FIG. 2 is a cross sectional view of the device and shows the interior parts of this unit, including the chlorine chambers 13, 30. The granulated chlorine chamber 13 is connected at the top or first end to the granulated chlorine chamber lid 6.

At the bottom of the granulated chlorine chamber 13 is a valve, 22, which allows granulated chlorine to pass from the holding chamber 13 to the mixing chamber 21. A vibrator 40 is provided to assist the granulated chlorine to travel into the mixing chamber 21 through the valve 22. Pool water enters the mixing chamber 21 and allows the granulated chlorine to be appropriately mixed prior to entering the pool. The mixing chamber 21 allows the granulated chlorine to be mixed with the water from the filter and distributed into the pool first through a valve 81 and through the outlet line 25 to the pool. The liquid chlorine chamber 30 is connected at the top or first end of the liquid chlorine lid 7. At the bottom of the liquid chlorine chamber 30 is a valve 80, which allows liquid chlorine to be injected directly into the pool water through line 25.

In addition, other valves 26 in the chemical chambers 28 may also let other chemicals to be mixed into the pool water and enter the pool via the outlet line 25 from this device.

After the chlorinating cycle is complete the mixing chamber 21 needs to be emptied of the remaining water. At the bottom of the mixing chamber a valve 27 is positioned to empty the contents of the mixing chamber 21. A small pump 24 with an appropriate power source is provided to empty the mixing chamber contents through a discharge line 18.

A power source to operate the vibrator 40 on the granulated chlorine chamber, chemical mixing valves 26, 80, pump 24 and valves 27, 22, 81 is also provided. The power source is likely to be alternating current 25 but may be a plurality of batteries as well. An appropriate controller 23 as well as all necessary electrical connections is provided to monitor the chemical levels and control distribution of the chemicals and the flow of water through the system is provided.

It is contemplated that the device 10 will be made out of non-corrosive durable material such as hard plastic. The shell should be constructed so that the interior contents of the device are well protected. Other materials may be used depending on the cost of the particular material.

SECOND EMBODIMENT

Figure 3:
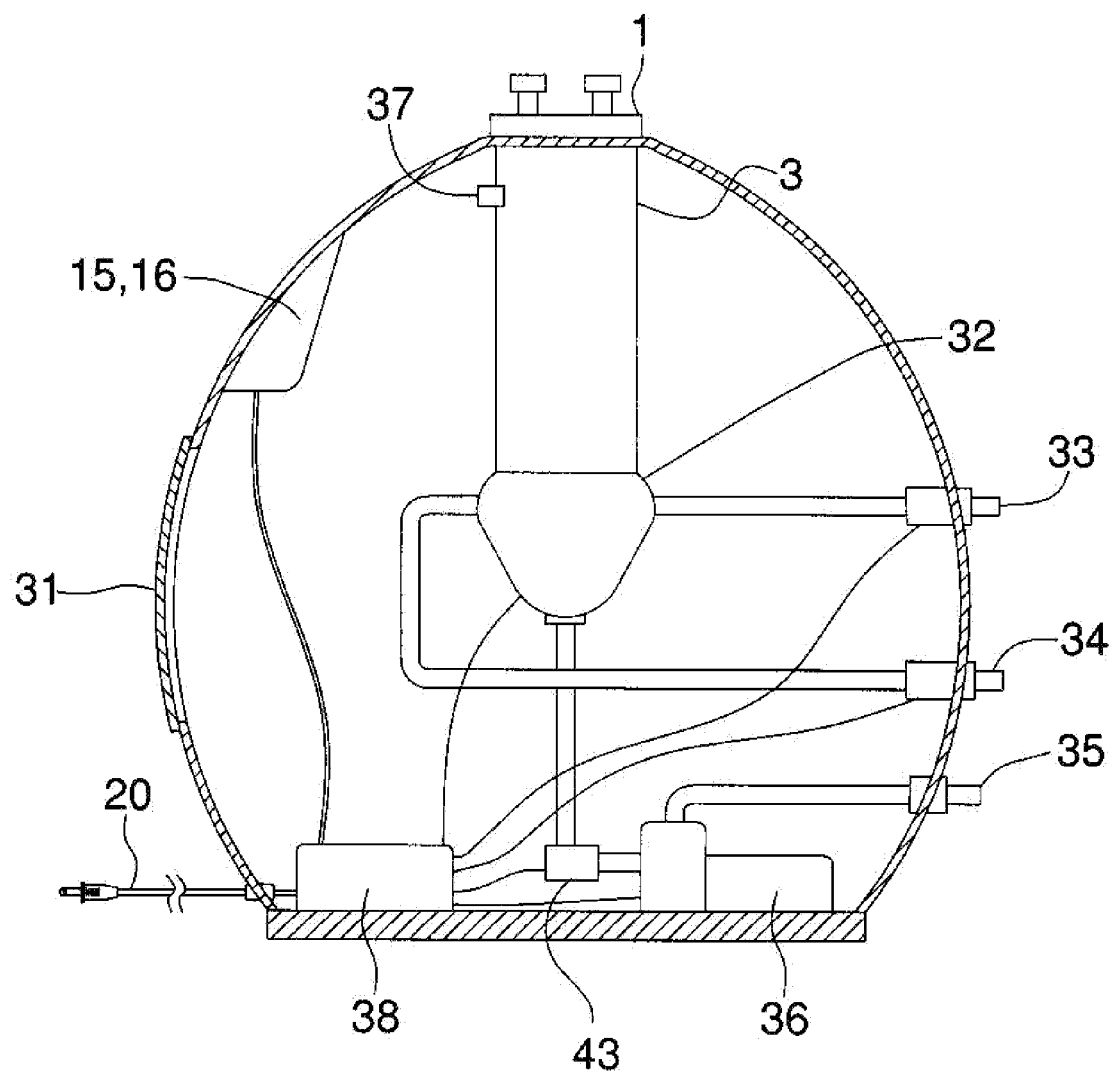
FIG. 3 is an alternative embodiment of the device.
Figure 4:
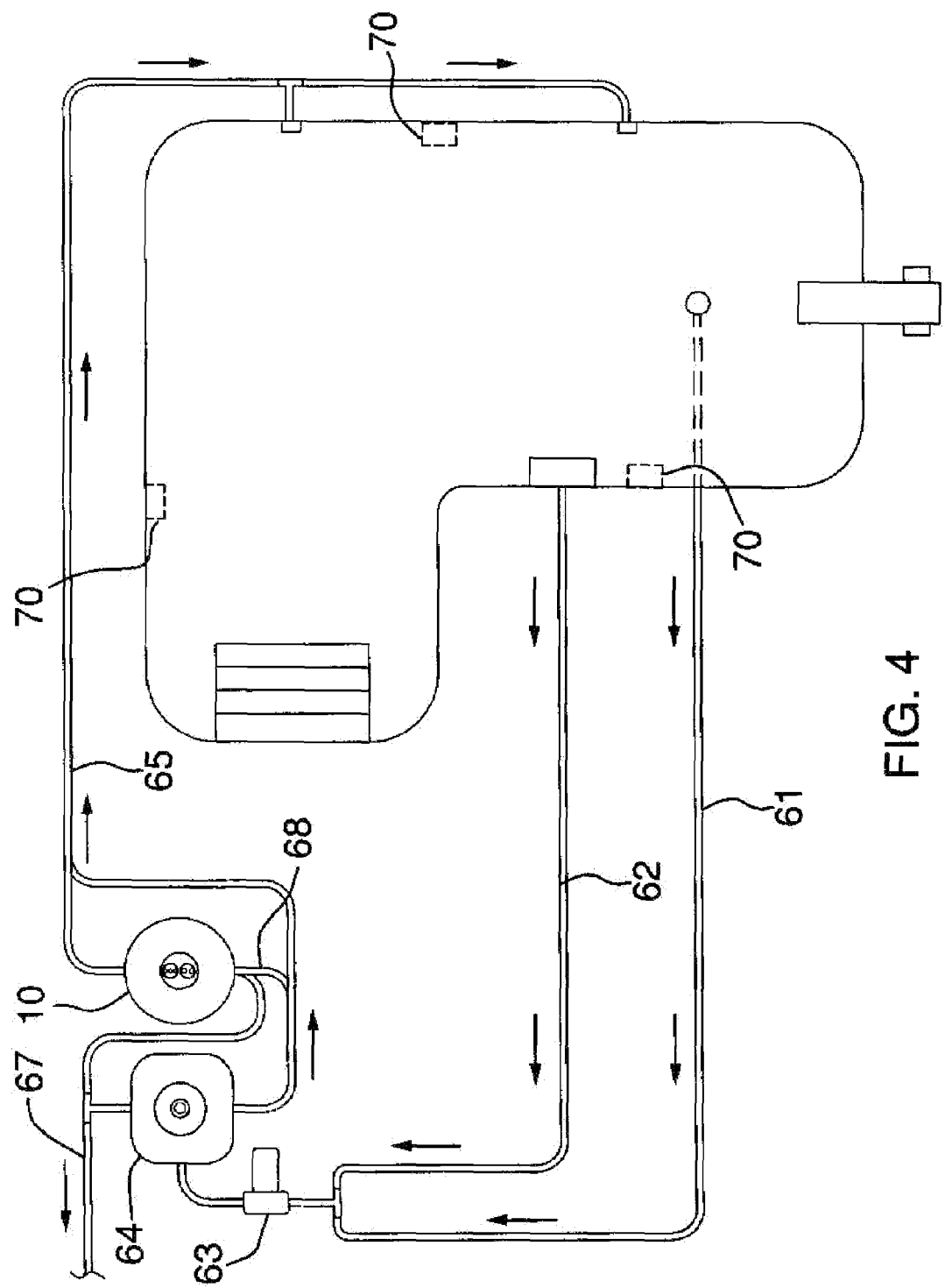
FIG. 4 is a schematic of the flow of water and chemicals in a pool system.

FIG. 3 represents the pool chemical monitor, which administers only granulated chlorine into a pool. The monitoring key pad and timer, 15, 16 are identical to the first embodiment. An access 1 to the chlorine chamber 3 is provided as well as a moisture collector 37.

Water enters the device through the intake line 33 and a valve (not depicted) controls the distribution of granulated chlorine into the mixing chamber 32. The chlorine is mixed and then exits the device to return to the pool through the outlet line 34. Because the contents of the mixing chamber 32 need to be emptied a valve 43 with a pump 36 has been installed for that purpose. It is anticipated that a pump 36 is used to empty the contents of the mixing chamber 32 through the discharge line 35.

An appropriate controller 38 to let granulated chlorine enter the pool at a pre-determined time is also provided as well as all needed electrical connections. This unit is also powered by alternating electrical current 20 but direct current may be used in certain circumstances.

An access panel 31 allows the user of the device to obtain access to the inner workings of the device.

The inventor claims:

1. A device used to monitor and add chemicals to a pool, which is comprised of:
   a. an outer shell;
   wherein the outer shell protects an inner portion of said device and allows chemical chambers to remain separate;
   wherein the outer shell rests on a base;
   said base is flat and supports the outer shell;
   b. power source;
   c. appropriate plumbing to and from the device;
   wherein the water from the pool is introduced through said plumbing into the device and allowed to mix with a chemical;
   wherein the water that exits the device reenters the pool;
   d. a means to introduce chemicals;
   wherein a controller is provided;
   wherein valves are provided;
   e. a means to introduce granulated chlorine;
   wherein a mixing chamber is provided;
   wherein a valve to allow entry of granulated chlorine into said mixing chamber is provided;
   wherein a vibrator is installed to assist the granulated chlorine into said mixing chamber;
   wherein a stream of water is allowed to enter said mixing chamber to mix the chlorine;
   f. means to prevent moisture;
   said means prevents moisture from entering a granulated chlorine chamber;
   g. mixing chamber;
   wherein said mixing chamber is provided to mix the granulated chlorine with a stream of water;
   h. liquid chemical chambers;
   wherein a plurality of chambers is provided to introduce liquid chemicals;
   i. a means to monitor a chemical;
   wherein a plurality of sensors is provided;
   j. a means of discharge;
   wherein the water that is mixed with chemicals is allowed to reenter the pool;
   k. mixing chamber drain;
   l. piping.

2. The device as described in claim 1 wherein the means to introduce chemicals is a plurality of chambers contained within an inner shell.

3. The device as described in claim 1 wherein the means to discharge water from the mixing chamber is a pump.

4. The device as described in claim 1 said means to monitor a chemical is comprised of a key pad and remote sensors.

5. The device as described in claim 1 wherein the power source is alternating current.

6. The device as described in claim 1 wherein the power source is direct current.

* * * * *